United States Patent

[11] 3,592,342

[72] Inventor Joe L. Shankle
 1030 Bridge View Drive, Placerville, Calif. 95667
[21] Appl. No. 869,231
[22] Filed Oct. 24, 1969
[45] Patented July 13, 1971

[54] SEPTIC TANK EFFLUENT CHLORINATOR UNIT
 1 Claim, 6 Drawing Figs.
[52] U.S. Cl. .................................................. 210/127, 210/198
[51] Int. Cl. .................................................. B01d 57/00
[50] Field of Search .......................................... 210/62, 198, 101, 105, 127, 532

[56] References Cited
UNITED STATES PATENTS
| | | | |
|---|---|---|---|
| 292,046 | 1/1884 | Powers | 210/127 |
| 408,432 | 8/1889 | Powers | 210/127 |
| 1,007,647 | 10/1911 | Darnall | 210/62 |
| 1,277,378 | 9/1918 | Case | 210/101 X |

FOREIGN PATENTS
| | | | |
|---|---|---|---|
| 21,566 | 1907 | Great Britain | 210/127 |

Primary Examiner—J. L. Decesare
Attorney—Alexander B. Blair

ABSTRACT: A chlorinator unit for the effluent of a septic tank in which a flow restrictor in the distributor box maintains a head of effluent and as the head rises a float actuated valve is opened to emit chlorinated water into the distributor box to mix with the effluent prior to its moving on to the septic tank field.

INVENTOR.
JOE L. SHANKLE
BY Alexander B. Blair
ATTORNEY.

PATENTED JUL 13 1971 3,592,342

INVENTOR.
JOE L. SHANKLE
BY
Alexander B. Blair
ATTORNEY.

3,592,342

SEPTIC TANK EFFLUENT CHLORINATOR UNIT

BACKGROUND OF THE INVENTION

Field of the Invention

The present invention relates to the chlorination treatment of the effluent from a septic tank so that in the event that due to excess rain, soaking of the ground or any other condition that would prevent the effluent from leaching into the soil and thus reaching the surface or a stream of water without being leached through the soil, the chlorination will have sterilized the effluent so that it will not be harmful.

SUMMARY OF THE INVENTION

The present invention consists of a completely underground system in which a 55-gallon drum of chlorinated water is pressure or gravity fed to a float-controlled valve system in the distributor box of a conventional septic tank system so as to feed chlorinated water into the effluent from the septic tank in accordance with the flow therefrom.

Several forms of float-controlled valves are illustrated for practicing the invention.

The primary object of the invention is to provide a system for adding chlorinated water to the effluent of a septic tank in order to sterilize the effluent should it reach the surface or a stream of water without having been sterilized by natural means.

Other objects and advantages will become apparent in the following specification when considered in light of the attached drawings.

DESCRIPTION OF PREFERRED EMBODIMENTS

Figure 1:
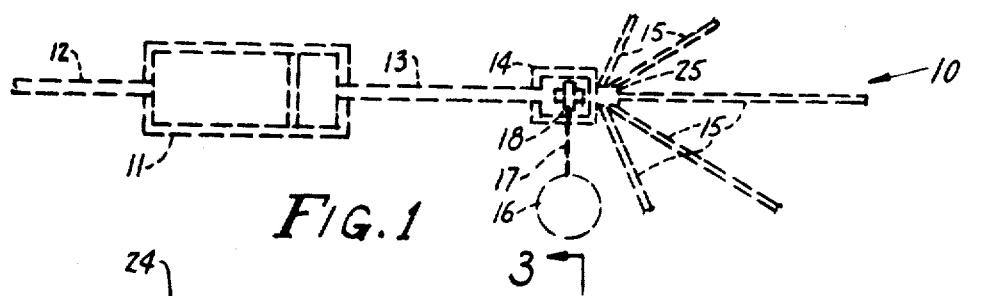
FIG. 1 is a top plan view of the invention shown installed in a septic system.
Figure 2:
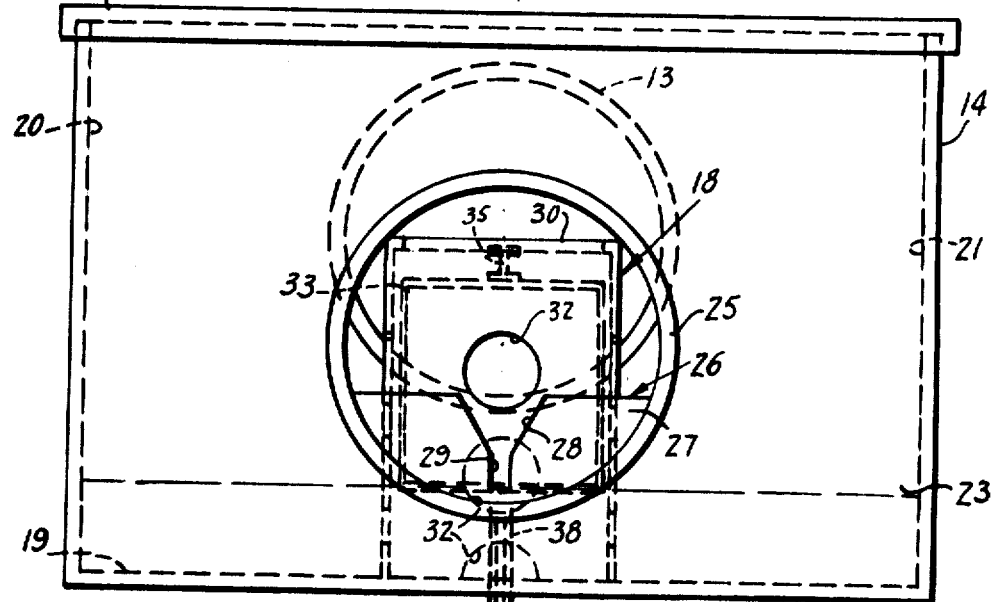
FIG. 2 is a side elevation of the distributor box forming part of the present invention.

Referring now to the drawings in detail wherein like reference characters indicate like parts throughout the several figures the reference numeral 10 indicates generally an effluent chlorination system for septic tanks constructed in accordance with the invention.

The system 10 includes a septic tank 11 connected by a sewer pipe 12 to a source of sewage and having an effluent conduit 13 extending from the opposite side thereof and adapted to conduct effluent away from the septic tank 11 all in a conventional manner. A distributor box 14 is connected to the conduit 13 and a plurality of septic tank field pipes 15 extend from the distributor box 14 to distribute the effluent from the septic tank 11 to the septic field (not shown).

Figure 3:
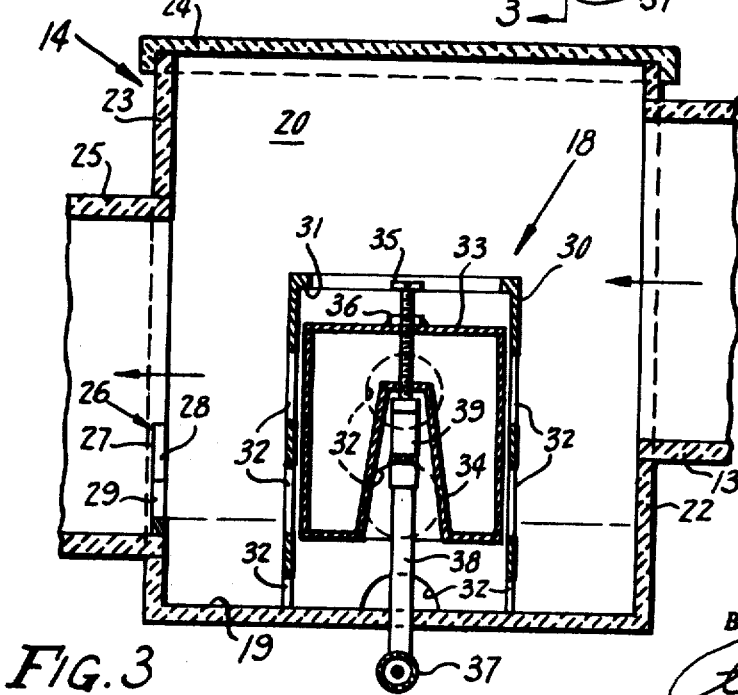
FIG. 3 is a transverse vertical cross section taken along the line 3-3 of FIG. 2 looking in the direction of the arrows shown partially broken away for convenience of illustration.
Figure 4:
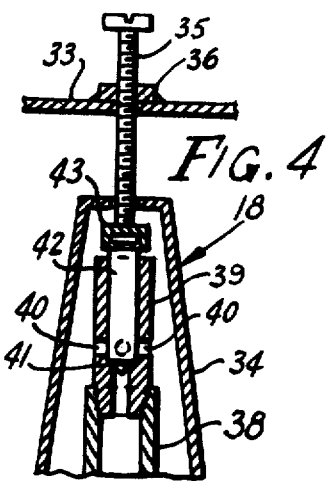
FIG. 4 is an enlarged fragmentary vertical sectional view of the valve structure illustrated in FIG. 3.

A chlorinated water supply tank 16 is positioned adjacent to the distributor box 14 and has a pipe 17 extending into the distributor box 14 to a control valve system generally indicated at 18. The distributor box 14 is of generally rectangular form and has a bottom wall 19, opposite end walls 20, 21, an inlet sidewall 22 and an outlet sidewall 23. The bottom wall 19, the end walls 20, 21, and the sidewalls 22, 23 are all integrally joined to form a hollow box closed at the top by a removable cover 24. The conduit 13 enters the distributor box 14 through the inlet sidewall 22 as can be best seen in FIG. 3. An outlet manifold 25 is secured to the outlet sidewall 23 and has the conduits 15 connected thereto.

A flow regulator generally indicated at 26 is positioned between the distributor box 14 and the outlet manifold 25 to maintain a head in the distributor box 14. The flow regulator 26 includes a horizontal dam 27 having a height substantially less than half the diameter of the outlet manifold 25 and being provided with a V-shaped opening 28 intermediate the opposite sides thereof with the lower portion of the opening 28 continuing as a rectangular opening 29 of relatively narrow proportions.

A generally cylindrical float cage 30 is positioned on the bottom wall 19 centrally of the distributor box 14 extending upwardly therefrom and terminating in an annular flange 31 which projects inwardly as a retainer flange. The float cage 30 has perforations 32 in the sidewall thereof to permit free flow of effluent. A generally cylindrical float 33 is mounted for vertical movement in the cage 30 and has a conical opening 34 extending upwardly from the bottom wall thereof. The float 33 is sealed and has an adjustment bolt 35 extending therethrough and threaded into a nut 36 secured to the top wall of the float 33.

The chlorinated water pipe 17 extends from the drum 16 to a point underlying the float 33 and has a hand-controlled valve 37 provided for shutting off the flow of the chlorinated water through the pipe 17. A stub pipe 38 extends upwardly from the valve 37 through the bottom 19 of the distributor box 14. A valve body 39 is secured to the upper end of the stub pipe 38 and has a plurality of ports 40 opening through the sidewall thereof. A needle valve seat 41 is formed centrally of the valve body 39 for cooperation with a needle valve 42 connected at its upper end to a swivel connection 43 mounted on the lower end of the bolt 35. By adjusting the position of the bolt 35 the height of effluent in the distributor box 14 sufficient to open the valve 42 can be varied in order that a correct quantity of chlorinated water can be admitted to the distributor box 14 to sterilize the effluent therein. The drum 16 of chlorinated water can either be provided with a pressure pump or mounted to permit gravity flow so that whenever the valve 42 is opened chlorinated water will flow into the distributor box 14.

Figure 5:
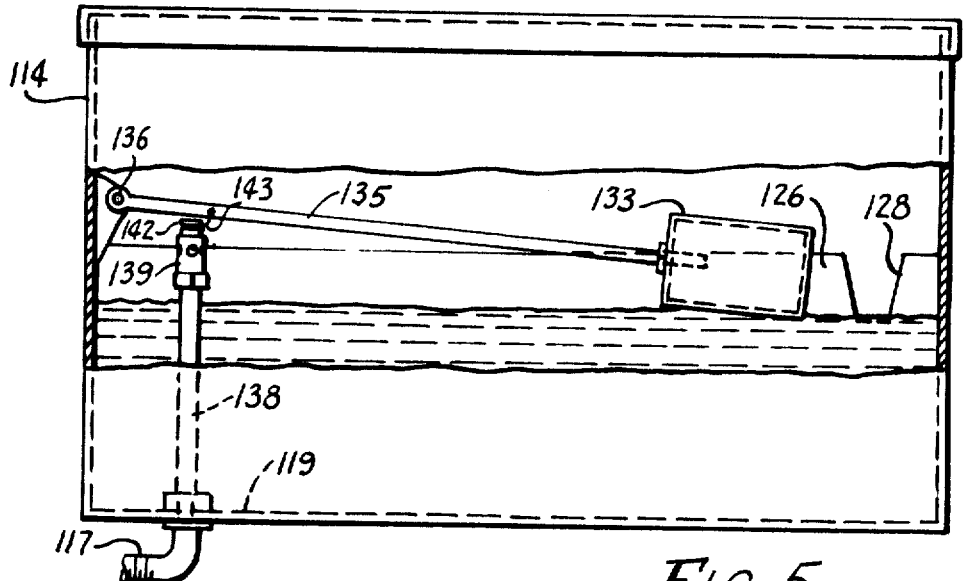
FIG. 5 is a side elevation of a modified form of the invention shown partially broken away and in section for convenience of illustration.

In FIG. 5 a modified form of the invention is illustrated wherein a distributor box 114 is provided with a V-shaped opening 128 in a flow regulator plate 126 to maintain the correct head within the distributor box 114. A pipe 117 extends from a source of chlorinated water (not shown) and extends upwardly through the bottom 119 of the distributor box 114 with a stub pipe 138 projecting upwardly therefrom and terminating in a valve body 139. A needle valve 142 is mounted for reciprocation in the valve body 139. A float shaft 135 is pivoted at 136 to the distributor box 114 and has a float 133 secured to the outer end thereof to float on the effluent in the distributor box 114. A flexible connector 143 connects the float shaft 135 to the needle valve 142 so that upon movement of the float 133 in the distributor box 114, the rate of flow of chlorinated water through the stub pipe 138 can be controlled.

Figure 6:
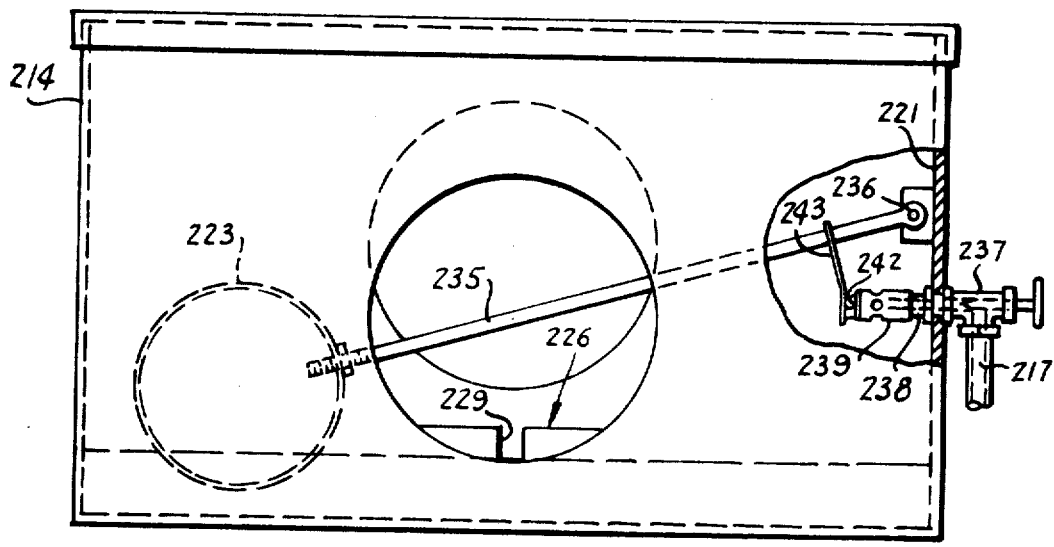
FIG. 6 is a side elevation of another modified form of the invention shown partially broken away and in section for convenience of illustration.

Referring now to FIG. 6 another modified form of the invention is shown wherein a distributor box 214 has an end wall 221 through which a stub pipe 238 extends. A chlorinated water conduit 217 is connected to the stub pipe 238 through a hand-controlled valve 237. A valve body 239 is mounted on the stub pipe 238 and has a needle valve 242 slidably mounted therein. A float shaft 235 is pivoted at 236 to the side 221 of the distributor box 214 and carries a float 233 on its outer end. A spring clip 243 connects the needle valve 242 to the float shaft 235 so that the needle valve 242 is opened and closed as the float 233 is raised and lowered on the effluent in the distributor box 214. An outlet flow regulator generally indicated at 226 has a generally rectangular slot 229 formed therein to maintain a head within the distributor box 214.

Having thus described the preferred embodiments of the invention, it should be understood that numerous other struc- tural modifications and adaptations may be resorted to without departing from the spirit of the invention.

What I claim is:

1. An effluent chlorinator for septic tank systems comprising a septic conduit, a chlorinated water tank positioned adjacent said conduit, means connecting said conduit and said tank for delivering chlorinated water from said tank to said conduit, a cylindrical casing mounted in said conduit and having a plurality of apertures in the sidewall thereof and an aperture in the top wall thereof and concentric therewith, the longitudinal axis of said casing intersecting the longitudinal axis of said conduit, said means including a pipe extending into said conduit along the axis of said casing, a shaft having the bottom portion thereof slidably extending into said pipe forming a needle valve connection, and a cylindrical float slidably positioned within said casing and adjustably mounted along the axis thereof to said shaft allowing manual regulation of the entry of chlorinated water into said conduit in addition to automatic regulation due to the change in height of effluent in said conduit.